(12) United States Patent
Sufleta et al.

(10) Patent No.: US 9,912,575 B2
(45) Date of Patent: Mar. 6, 2018

(54) ROUTING NETWORK TRAFFIC PACKETS THROUGH A SHARED INLINE TOOL

(71) Applicant: Gigamon Inc., Santa Clara, CA (US)

(72) Inventors: Zbigniew Sufleta, Cobb, CA (US); Hung Chuen Jason Lee, Palo Alto, CA (US); Ramakrishna Manchiraju-Venkata, Sunnyvale, CA (US); Tanmay Kishore, Fremont, CA (US); Yan Xiu, San Ramon, CA (US); Hung Nguyen, Santa Clara, CA (US); Sitti Amarittapark, Santa Clara, CA (US)

(73) Assignee: Gigamon Inc., Santa Clara, CA (US)

( * ) Notice: Subject to any disclaimer, the term of this patent is extended or adjusted under 35 U.S.C. 154(b) by 163 days.

(21) Appl. No.: 14/945,347

(22) Filed: Nov. 18, 2015

(65) Prior Publication Data

US 2017/0141996 A1    May 18, 2017

(51) Int. Cl.
*H04L 12/751* (2013.01)
*H04L 12/721* (2013.01)
*H04L 29/06* (2006.01)

(52) U.S. Cl.
CPC .............. *H04L 45/02* (2013.01); *H04L 45/26* (2013.01); *H04L 63/1416* (2013.01)

(58) Field of Classification Search
CPC ...... H04L 45/02; H04L 45/26; H04L 63/1416
See application file for complete search history.

(56) References Cited

U.S. PATENT DOCUMENTS

| 5,764,634 A * | 6/1998 | Christensen | ......... H04L 49/351 370/389 |
| 5,940,376 A * | 8/1999 | Yanacek | ............ H04Q 11/0478 370/250 |
| 6,567,408 B1 * | 5/2003 | Li | ........................ H04L 12/5601 370/395.31 |
| 6,597,661 B1 * | 7/2003 | Bonn | ...................... H04L 29/06 370/235 |
| 6,757,742 B1 * | 6/2004 | Viswanath | ........ H04L 29/12018 370/389 |
| 6,853,639 B1 | 2/2005 | Nozaki et al. | |
| 6,925,085 B1 * | 8/2005 | Krishna | ................ H04L 45/745 370/389 |

(Continued)

OTHER PUBLICATIONS

U.S. Appl. No. 14/880,036 of Sufleta, Z. et al. filed Oct. 9, 2015.

(Continued)

*Primary Examiner* — Tejis Daya
(74) *Attorney, Agent, or Firm* — Perkins Coie LLP (57) ABSTRACT

Introduced herein is a technology for a network switch device to route network packets through a inline tool, without introducing additional information to the network packets. The technology records an association between an input network port and a signature (e.g., source MAC address) of the network packet, before forwarding the packet to the inline tool. When receiving the packet back from the inline tool, the network device recognizes that the packet signature is associated with the input network port, and that the input network port is paired with a particular output network port. Thus, the network device identifies the output network port for sending the packet, without modifying contents of the packet.

23 Claims, 7 Drawing Sheets

(56) References Cited

U.S. PATENT DOCUMENTS

| | | | |
|---|---|---|---|
| 6,950,434 B1* | 9/2005 | Viswanath | H04L 49/3009 370/392 |
| 7,596,808 B1* | 9/2009 | Wilkinson | H04L 63/0272 709/223 |
| 8,964,753 B2* | 2/2015 | Basso | H04L 45/50 370/389 |
| 9,065,723 B2* | 6/2015 | Stevens | H04L 43/026 |
| 9,356,866 B1* | 5/2016 | Sivaramakrishnan | H04L 45/7453 |
| 9,479,522 B1* | 10/2016 | Cirkovic | H04L 63/1416 |
| 9,497,205 B1* | 11/2016 | Claudatos | H04L 63/1425 |
| 9,565,100 B1* | 2/2017 | Edsall | H04L 12/6418 |
| 9,674,115 B2* | 6/2017 | Raza | H04L 49/15 |
| 2001/0052087 A1* | 12/2001 | Garg | H04L 41/06 714/37 |
| 2003/0033435 A1* | 2/2003 | Hanner | H04L 69/04 709/247 |
| 2003/0142676 A1* | 7/2003 | Zeisz, Jr. | H04L 47/10 370/395.1 |
| 2003/0147385 A1* | 8/2003 | Montalvo | H04L 47/125 370/389 |
| 2004/0190547 A1* | 9/2004 | Gordy | H04L 63/02 370/463 |
| 2005/0005031 A1* | 1/2005 | Gordy | H04L 63/1408 709/250 |
| 2005/0013300 A1* | 1/2005 | Akahane | H04L 43/00 370/395.3 |
| 2006/0215566 A1* | 9/2006 | Walsh | H04L 43/10 370/241 |
| 2007/0081549 A1* | 4/2007 | Cicchetti | H04L 12/10 370/447 |
| 2007/0280222 A1 | 12/2007 | Smith et al. | |
| 2009/0006600 A1* | 1/2009 | Siegmund | H04L 41/08 709/223 |
| 2009/0259811 A1* | 10/2009 | Krishnan | G06F 17/30982 711/108 |
| 2010/0118885 A1* | 5/2010 | Congdon | H04L 49/254 370/419 |
| 2011/0058566 A1* | 3/2011 | Leong | H04L 49/109 370/401 |
| 2011/0211473 A1* | 9/2011 | Matityahu | H04L 47/10 370/252 |
| 2011/0214181 A1* | 9/2011 | Matityahu | H04L 41/0668 726/23 |
| 2011/0276824 A1* | 11/2011 | Cheung | G06F 11/2015 714/14 |
| 2012/0317566 A1* | 12/2012 | Santos | G06F 9/45558 718/1 |
| 2013/0201984 A1* | 8/2013 | Wang | H04L 49/354 370/389 |
| 2013/0259037 A1 | 10/2013 | Natarajan et al. | |
| 2014/0022891 A1* | 1/2014 | Matityahu | H04L 43/12 370/225 |
| 2014/0201307 A1* | 7/2014 | Banavalikar | H04L 45/742 709/213 |
| 2014/0219081 A1 | 8/2014 | Natarajan et al. | |
| 2015/0319070 A1* | 11/2015 | Nachum | H04L 12/4633 370/400 |
| 2017/0026227 A1* | 1/2017 | Lian | H04L 41/0668 |
| 2017/0026287 A1* | 1/2017 | Vinsel | H04L 45/66 |

OTHER PUBLICATIONS

Non-Final Office Action dated Aug. 25, 2017, for U.S. Appl. No. 14/880,036 of Sufleta et al. filed Oct. 9, 2015.

* cited by examiner

ROUTING NETWORK TRAFFIC PACKETS THROUGH A SHARED INLINE TOOL

TECHNICAL FIELD

The present disclosure generally relates to network switch devices, and more particularly, to network switch devices that route network traffic through an inline tool.

BACKGROUND

With ever-increasing amounts of data traffic on modern computer networks, network monitoring tools play an increasingly important role in reducing the vulnerability of a network to intrusion, unauthorized access and other security or performance issues. Examples of network monitoring tools include an intrusion detection system (IDS), an intrusion prevention system (IPS), a sniffer, a network monitoring system, an application monitoring system, an intrusion detection system, a forensic storage system, an application security system, among others. An "inline" network monitoring tool (or "inline tool") is a tool that is part of the data flow, or path, between two other devices that are part of the network and communicate with each other on the network.

A network device may receive data packets from a source node on a network and utilize packet switching to forward the packets on the network for transmission to a destination node. Such a network device may also first pass the packets it receives to an inline tool such as described above, before forwarding them to the destination network node. The network device includes multiple network ports for transmitting packets to and from various network nodes, and further includes one or more tool ports for routing those packets to an inline tool for analysis. Such inline connectivity provided by the network device enables uninterrupted traffic flow between computing devices connected together on the network. However, existing techniques that use a network device to route packets through an inline tool have various limitations.

DETAILED DESCRIPTION

Introduced here is a technology for using a network device (e.g., an appliance) to route network packets (also referred to as simply "packets") being communicated on a network through one or more inline tools, by recording associations between signatures of the packets and the input network ports that receive the packets. By associating a packet signature with an input network port, the network device identifies a packet transmission route involving a pair of the input network port and an output network port. The pairing relationship between the input and output network ports can be determined, e.g., by the physical configuration of the network device or based on a configuration instruction from users or administrators.

As described further below, the network device forwards packets that it receives, from one or more external network nodes on a network, to at least one external inline tool. The inline tool then returns those packets to the network device after analysis or other processing of those packets, and the network device then forwards the returned packets on the network to their intended destinations. The network device includes a network switching fabric for routing and forwarding packets between network ports of the network devices. An example of a network switching fabric is a layer 2 switching fabric. As used here, the term "layer 2 switching fabric" refers to a device that uses hardware addresses (i.e., "media access control address" or "MAC addresses") of computing devices connected together on a network to receive and forward data packets at the data link layer (i.e., "layer 2") of the OSI model. One goal of the technology introduced here is to properly route data packets received by the network device through one or more external inline tools without introducing any additional information into (or otherwise modifying) the packets, since modification of packets might causes errors or misinterpretation by the inline tool(s).

Traditionally, a network switching fabric ensures proper packet routing by inserting additional information into a packet prior to sending the packet to the inline tool. One example of such a technique involves utilizing the virtual local area network (VLAN) standard to route the packet. Under such standard, a virtual area network (VLAN) operates as a dedicated broadcast domain. A VLAN "tag," which is four bytes in size, is injected into a packet to identify the VLAN to which the packet belongs, such that the packet can be routed to the appropriate destination on its return journey (e.g., after being processed by the inline tool).

Using the VLAN standard for routing through the inline tool, however, has disadvantages. For example, use of VLAN tags necessarily adds complexity to the monitoring process, such as having to set up the VLAN infrastructure, inject the VLAN tag to the packet, and set up the catching mechanism to capture the packet on its return journeys. Additionally, under the VLAN standard, only 4000 communication endpoints can be established because only 12 bits of the four-byte VLAN tag are reserved for holding the VLAN ID.

The VLAN tag is an example of injecting additional information into the packet. Such approach of injecting additional information into the packet for routing it through the inline tool has disadvantages. The approach needs a special infrastructure for injecting additional information into the packet and setting up the information retrieval mechanism. Furthermore, the additional information caused by the undesired modification can confuse the inline tool in its analysis of the packet.

In contrast, the technology introduced here properly routes a packet, intended for transmission from a first network port to a second network port of the network device, through an inline tool and back to the network device, and on to its destination, without adding any information to the packet. In at least some embodiments, the technology records an association between a signature (e.g., destination MAC address) of the network packet and the first network port, prior to sending the packet to the inline tool. After the packet is processed by the inline tool, the network device receives back the packet and identifies the recorded association between the packet signature and the first network port. Because the pairing relationships between input ports and output ports are predetermined in the network device, the network device can identify for the packet a transmission route involving a pair of the first network port (input port) and a second network port (output port). Thus, even without injecting any additional information to the packet, the network device is still able to identify the second network port as the output port and forward the packet to the second network port.

Among other benefits, the introduced technology provides a solution for properly routing the network packets in a network environment including the external inline tool, without modifying the original content of the packets. Thus, there is no additionally injected information in the packet which can confuse the inline tool in its analysis of the packet. The technology is highly efficient, since the size of the lookup table recording the packet-port associations can be kept in a reasonably small scale. Additionally, as the introduced technique provides a solution using a hardware-based address table, the technique can support a high data throughput (e.g., terabytes of data), unlike existing software-based solutions.

It is noted that in this description, the term "packet" can refer to the original packet transmitted from a network node, or a copy of it. Additionally, the term "tool port" refers to any port through which packets are to be transmitted to or from a tool. The tool can be a pass-through device (i.e., it can receive packets, and transmit the packets back to the network device after the packets have been processed), such as an intrusion prevention system. In some embodiments, the tool can be a non-pass through device (i.e., it can only receive packets intended to be communicated between two nodes, and cannot transmit such packets downstream), such as a sniffer, a network monitoring system, an application monitoring system, an intrusion detection system, a forensic storage system, an application security system, etc. Furthermore, the terms "first", "second", etc., are used to refer to different things, and do not necessarily refer to the order of things.

Additionally, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Figure 1:
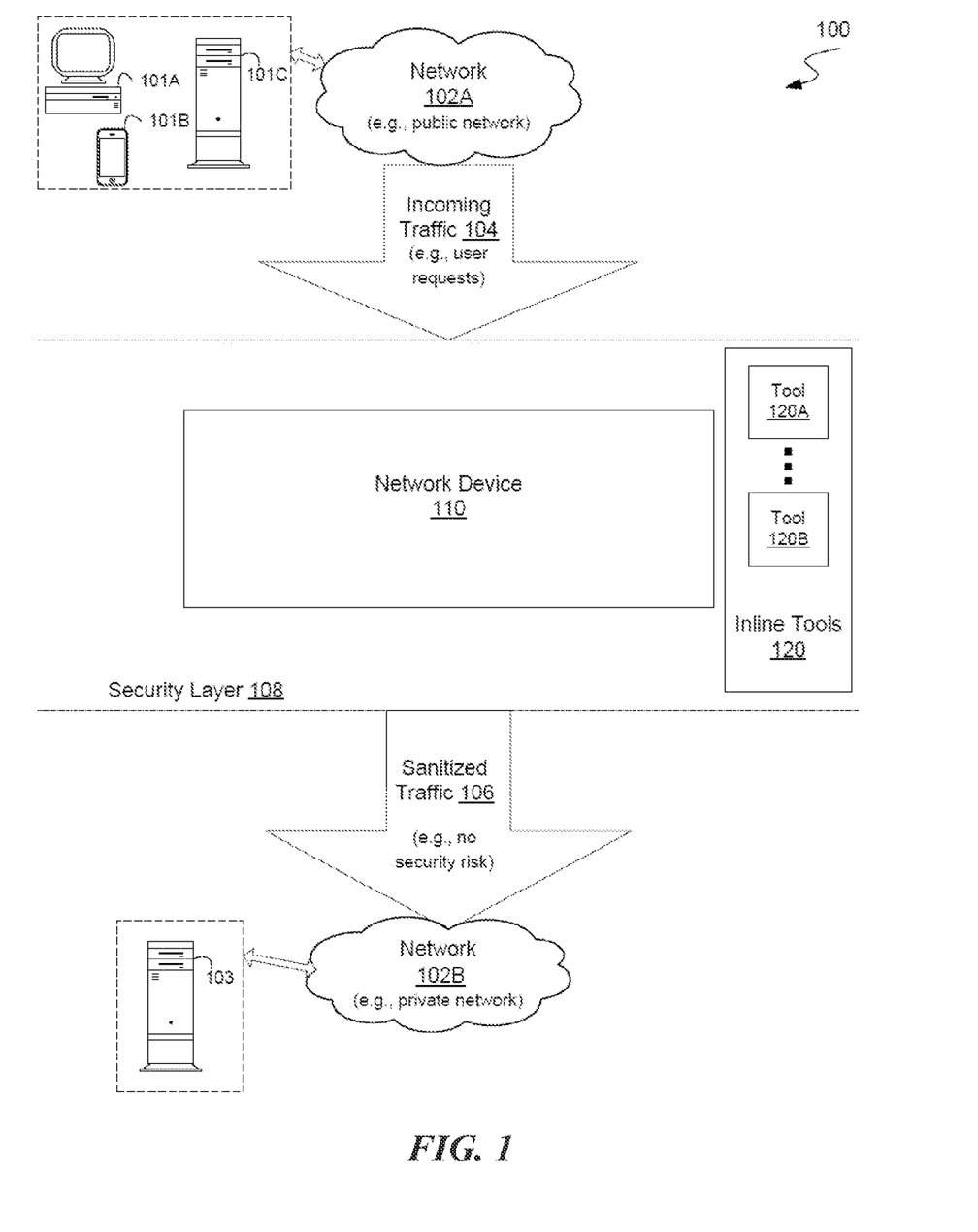
FIG. 1 illustrates a network environment for deployment of a network device.

FIG. 1 shows an example of a network-based environment 100 for deployment of a network switch device (or simply "network device") 110 in accordance with some embodiments. The environment 100 includes a network 102A, a network 102B and a security layer 108 between the networks 102A,102B. The security layer 108 includes a network device 110 and one or more inline tools 120. One or more computing devices 101 (e.g., a personal computer (PC) 101A, a smartphone 101B, a server 101C, etc.) can communicate with a server 103 via a network (e.g., the Internet). For example, a PC 101A, through a (public) network 102A, can access information and/or services provided by the server 103 operating within a (private) network 102B.

The network device 110 enables communication of data packets between the devices 101 and the server 103, in addition to routing the data packets through the inline tools 120 for examination and processing. In accordance with various embodiments of the disclosed technology, the network device 110 can be a conventional layer 2 switch. Examples of the network device 110 that can be used to implement features described herein include commercially available network switch devices, such as GigaVUE™ line of products, available from Gigamon Inc. of Santa Clara, Calif. In some embodiments, the network device 110 can use layer ⅔ switching fabrics. In other words, the delivery of user traffic from network ports to inline tool ports can be based on various criteria that involve both layer 2 and layer 3. Although FIG. 1 illustrates inline tools 120 for processing data packets travelling from network 102A to network 102B, the inline tools 120 can inspect data packets travelling in both directions. For example, the security-oriented inline tools may sanitize traffic flowing both ways in order to prevent attacks on private networks coming from the Internet and attacks on Internet resources coming from the private network. Also, the purpose of the inline tool inspection may be related to imposing a certain access policy ("censorship") for packets travelling in both directions.

For illustrative purposes, consider an example of a network of an online bank. A banking customer can use the smartphone 101B to connect, via the Internet, to an online banking service operated by the server 103 to request login to her online bank account (e.g., for money transfers, deposits, etc.). The customer's user login request is received via the network 102A in the form of incoming traffic 104. The incoming traffic 104 typically must traverse the security layer 108 (e.g., a firewall) before being admitted into the private network 102B for accessing the online banking services provided by the server 103. The security layer 108 can employ the network device 110 for routing traffic between the network 102A and the network 102B, and further for routing the traffic through the inline tools 120. The inline tools 120 can include, for example, an IDS, an IPS, a sniffer, a network monitoring system, an application monitoring system, an intrusion detection system, a forensic storage system, an application security system. The inline tools 120 can help, for example, the online bank, to verify that the incoming traffic 104 gets "sanitized" and/or to help prevent attacks on the network 102B of the online bank. If the inline tools 120 do not detect any bad actors, the data packets are forwarded through to the network 102B for further processing by the server 103, e.g., authentication of user login, access to banking services, etc.

Figure 2:
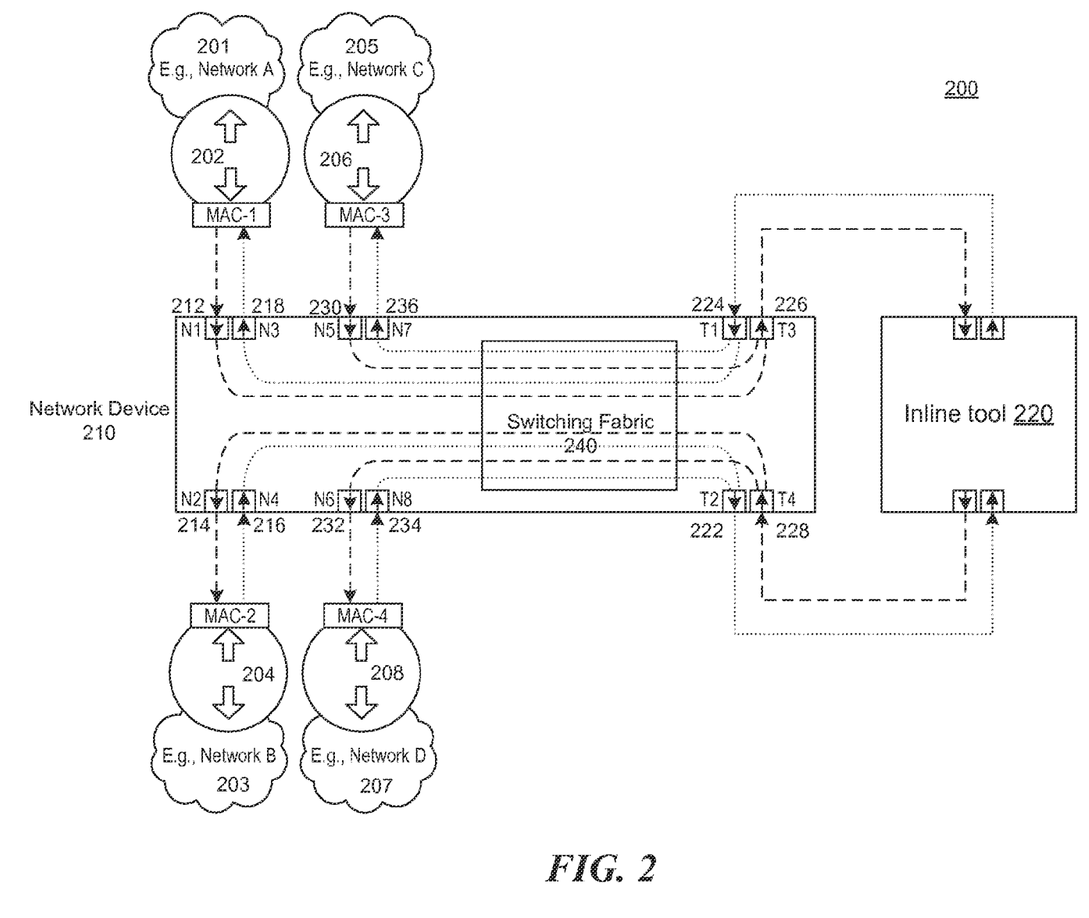
FIG. 2 illustrates a configuration of a network device in connection with an inline tool for providing a way to monitor network traffic flow.

FIG. 2 illustrates a configuration 200 of a network device 210 in connection with an inline tool 220 for providing a way to monitor network traffic flow, in accordance with some embodiments. The network device 210 can be the network device 110 of FIG. 1. As illustrated in FIG. 2, the configuration 200 includes the network device 210 set up to route packets between a network 201 (e.g., Network A) and a network 203 (e.g., Network B), and between a network 205 (e.g., Network C) and a network 207 (e.g., Network D). For example, the network device 210 can route packets from a network node 202 to a network node 204, and vice versa. Similarly, the network device 210 can route packets from a network node 206 to a network node 208, and vice versa. The network device 210 can further route the packets, being transmitted between the network nodes (e.g., 202 and 204 and/or 206 and 208), through the inline tool 220 for analysis. To carry out these routing functions, the network device 210 may include a switching fabric 240.

For transmission of packets between a particular set of network nodes, the network device 210 includes one or more pairs of network ports. For example, a first pair of network ports includes a first network port 212 ("N1") and second network port 214 ("N2") for transmission of packets between the network nodes 202, 204. A second pair of network ports includes a first network port 216 ("N4") and a second network port 218 ("N3") for transmission of packets between the network nodes 204, 202. Similarly, for transmission of packets between the network nodes 206, 208, the two pairs of network ports includes network ports 230, 232 ("N5, N6") and network ports 234, 236 ("N8, N7"). The network device 210 also includes at least two sets of tool ports for routing the packets through the inline tool 220. The first set of tool ports includes a first tool port 222 ("T2") and a second tool port 224 ("T1"). The second set of tool ports includes a first tool port 226 ("T3") and a second tool port 228 ("T4"). Accordingly, in some embodiments, the configuration 200 advantageously allows monitoring of at least two different network traffic links using a single inline tool.

In operation, the network device 210 can receive packets originating from the network 201 through the first network port 212 ("N1"). The network device 210 can route the packets to the first tool port 226 ("T3"), through which the packets are going to the inline tool 220 for processing. After being processed by the inline tool 220, the network device 210 receives the packets at the second tool port 228 ("T4") and directs the packets to the second network port 214 ("N2"). The network device 210 delivers the packets to the network 203 through the second network port 214 ("N2"). Thus, the network device 210 routes the packets from the network 201 to the network 203 through a route involving network ports N1-T3-T4-N2.

Similarly, the network device 210 routes packets from the network 203 to the network 201 through a route involving network ports N4-T2-T1-N3; routes packets from the network 205 to the network 207 through a route involving network ports N5-T3-T4-N6; and routes packets from the network 207 to the network 205 through a route involving network ports N8-T2-T1-N7.

In order to accomplish the above routing operations, the network device 210 needs to decide which network port the network device 210 will forward a packet when it receives the packet back from the inline tool. For example, the packets that the network device 210 receives from the second tool port 224 ("T1") can include packets from different source networks and are destined for different destination networks. The packets from T1 may include packets from the network 203, which should be delivered to the network 201. Furthermore, the packets from T1 may include packets from the network 207, which should be delivered to the network 205. The network device 210 needs to examine the packets received from T1 and decide whether the packets will be forwarded to the network port 218 ("N3") or the network port 236 ("N7").

In order to make such proper routing decisions when the packets travels from the inline tool 220 back to the network device 210, the network device 210 records associations between signatures of the packets and the network ports receiving the packets from the source network, prior to sending the packets to the inline tool 220. When the network device 210 receives back the packets from the inline tool 220, the network device 210 makes the routing decisions based on the associations between the packet signatures and the network ports.

The signatures of the packets can be any values that are extracted from or generated based on the packets. The network device 210 can use a signature of a particular packet to differentiate the particular packet from other packets that have different destinations from the destination of that particular packet. One example of the packet signature is destination media access control (MAC) address of the packet, or other types of addresses under protocols of the data link layer (also referred to as layer 2) of the seven-layer OSI (Open Systems Interconnection) model of computer networking. In some alternative embodiments, the packet signature can include other types of network address or identifier, such as destination Internet Protocol address (IP address) at layer 3 of the seven-layer OSI model.

For example, the network device 210 can receive a packet originating from the network 201 through the first network port 212 ("N1"). The packet includes a field storing the MAC address of the source device ("source MAC address"). The network device 210 extracts the source MAC address from the packet as the signature of the packet. The network device 210 further records an association between the packet's source MAC address and the network port 212 ("N1") in a data structure. The data structure can be, e.g., a look up table. Each entry of the lookup table records an association between a pair of a source MAC address and a network port.

The network device 210 routes the packet to the first tool port 226 ("T3"), through which the packet is going to the inline tool 220 for processing. After being processed by the inline tool 220, the network device 210 receives the packet at the second tool port 228 ("T4"). The network device 210 again extracts the MAC address from the packet, and finds a match of the source MAC address with an entry of lookup table.

Based on the entry, the network device 210 learns that the source MAC address of that packet is associated with the network port 212 ("N1"). The network device 210 further learns that the network port 212 ("N1") is paired with the network port 214 ("N2"). Thus, the network device 210 makes a decision to direct the packet to the network port 214 ("N2"), such that the packet is eventually delivered to the network 203 after being processed by the inline tool 220.

Therefore for each packet, the network device 210 records an entry in the lookup table for an association between the source MAC address and the input network port, when network device 210 receives the packet from a source network. When the network device 210 receives the packet back from the inline tool 220, the network device 210 can determine the output network port based on the lookup table entry and the pairing relationship between input and output network ports. Because the association entries are recorded before a packet being sent to the inline tool 220 and are utilized after the packet returns from the inline tool 220, the presence of a needed association entry in the lookup table is guaranteed.

Although FIG. 2 illustrates an embodiment of a network device 210 connected to an inline tool 220 for monitoring network traffic flow, a person having ordinary skill in the art readily appreciates that the technology can be applied to network devices connected to one or more inline tools for performing various functionalities. For example, a network device can be connected to a group of inline tools managed in a load sharing manner. Each of the inline tools performs a particular task on the network traffic packets. Alternatively, a network device can be connected to multiple inline tools arranged in a cascaded manner. Multiple inline tools can run within an umbrella inline tool. The umbrella inline tool manages its inline tools for performing various types of network traffic analysis and processing tasks.

Figure 3:
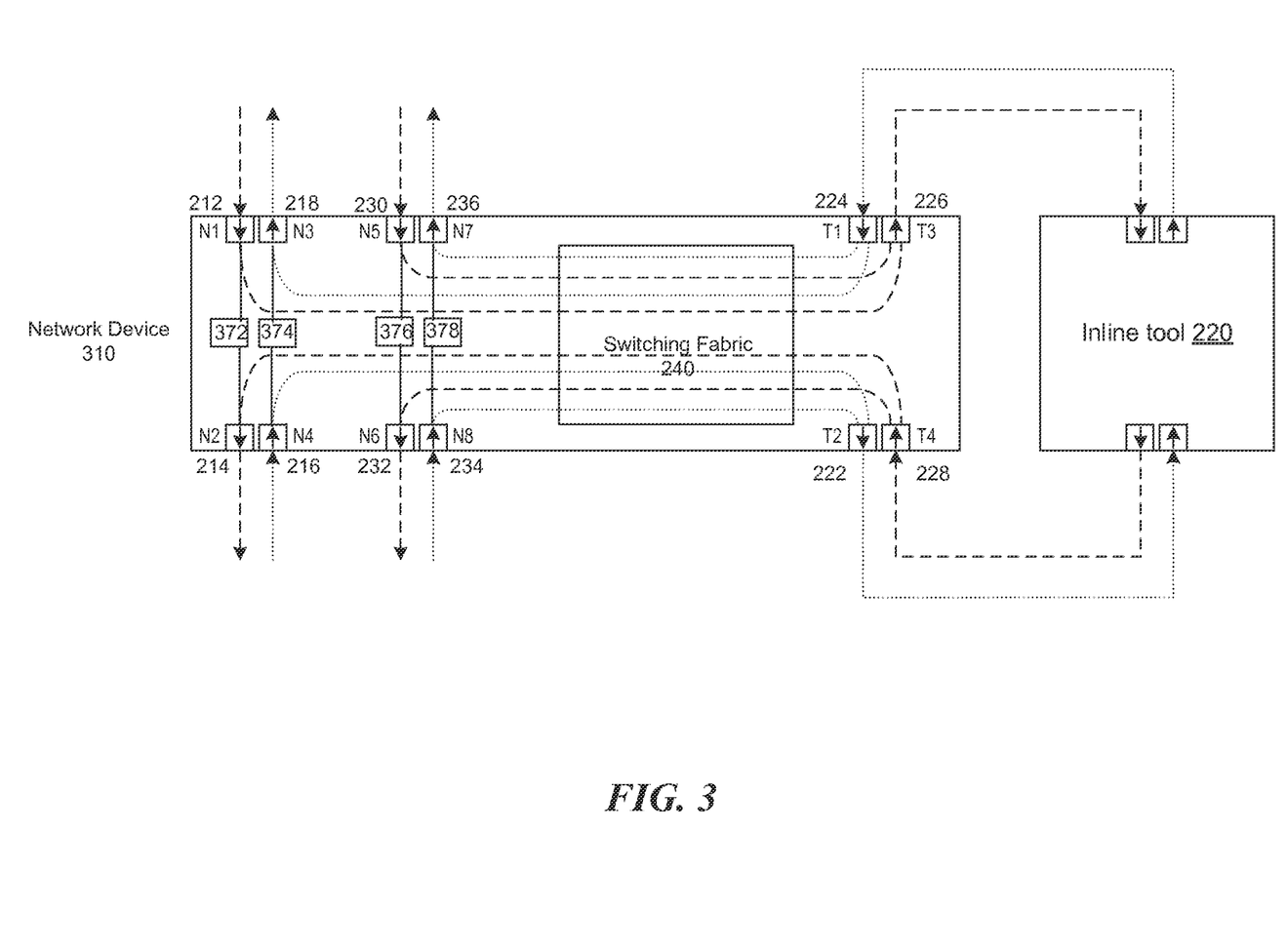
FIG. 3 illustrates an example of a network device including a plurality of pairs of network ports.

FIG. 3 illustrates an example of a network device including a plurality of pairs of network ports. The network device 310 includes a plurality of pairs of network ports through which to receive and transmit network packets between network nodes. For each individual pair, the network device routes all network packets received from one network port of the individual pair to another network port of the individual pair. For example, the network port 212 ("N1") and the network port 214 ("N2") form a pair. During normal operation, all network packets received at the network port 212 travel through the inline tool 220 and reach the network port 214.

In some embodiments, the physical configuration of the network device determines the pairing relationships between network ports. For example, the network device 310 can further include a plurality bypass relays 372, 374, 376 and 378. For each pair of network ports, there is one bypass relay interconnecting the two network ports of the pair. For example, the bypass relay 372 interconnects the pair of network ports 212 and 214.

During normal operation, the bypass relays are turned off. For example, the packets received at the network port 212 during normal operation cannot reach the network port 214 directly through the bypass relay 372. The packets have to travel through the tool ports and the inline tool 220 before reaching the network port 214.

When there is an error in the switching fabric 240 of the network device 310 or the inline tool 220, the packets are no longer able to reach the output network ports through the tool ports and the inline tool 220. In response the network device 310 generates an exception signal. In response to the exception signal, the network device 310 turns on the bypass relays 372, 374, 376 and 378, such that all packets received at one network port (e.g., 212) of an individual pair can travel to the other network port (e.g., 214) of that individual pair directly through a bypass relay (e.g., 372) corresponding to that individual pair.

In the network device 310 illustrated in FIG. 3, the pairing relationships between the network ports are physical, determined based on the bypass relays interconnecting the pairs of network ports. Alternatively, the pairing relationships between the network ports can be determined based on a configuration instruction from a user or administrator for setting up pairs of the network ports.

Figure 4:
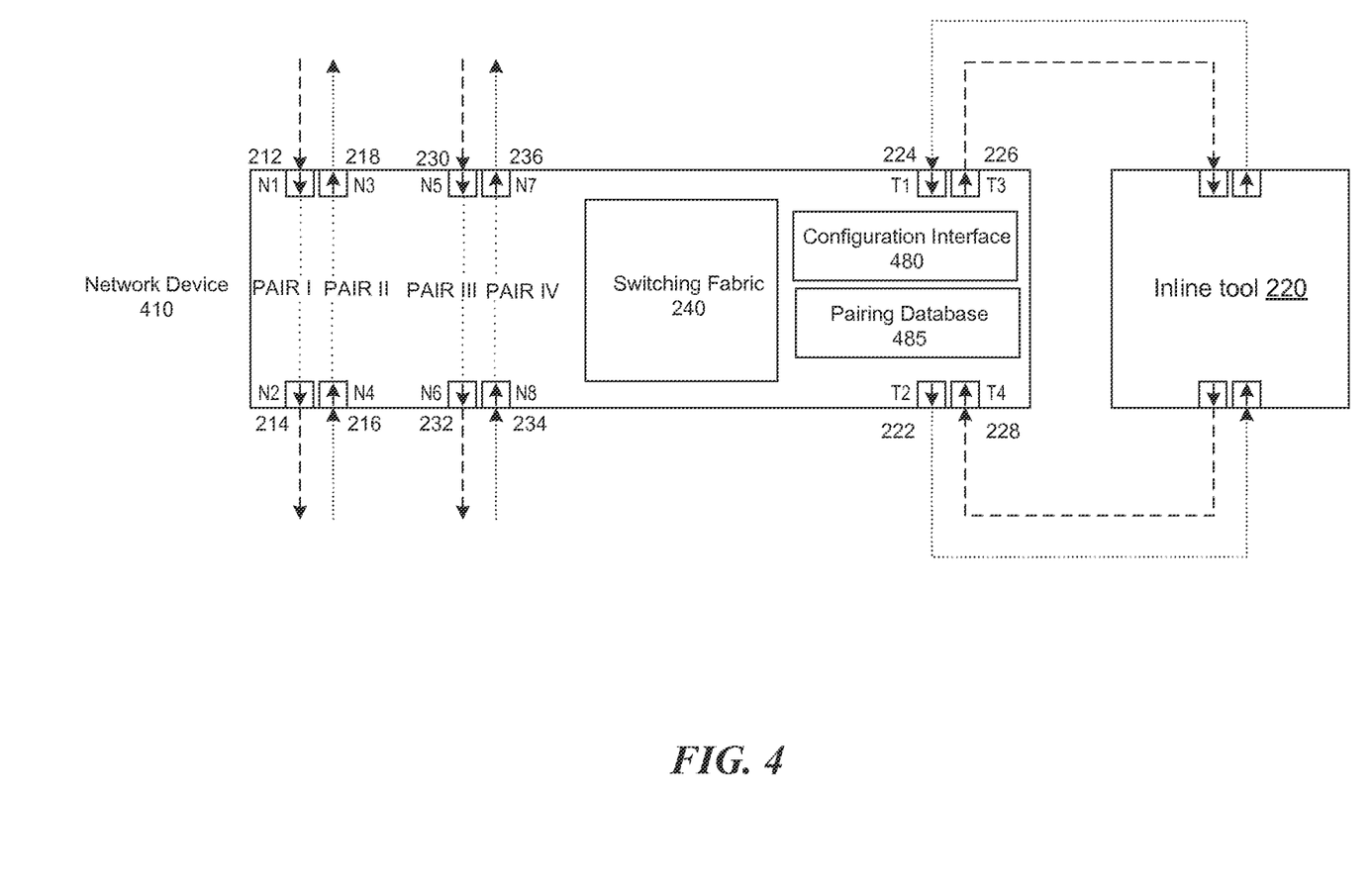
FIG. 4 illustrates another example of a network device including a plurality of pairs of network ports.

FIG. 4 illustrates another example of a network device including a plurality of pairs of network ports. The network device 410 includes a configuration interface 480 for receiving configuration instructions from users or administrators. The configuration interface 480 can operate under, e.g., the Secure Shell (SSH) protocol or the HyperText Transfer Protocol (HTTP). The configuration interface 480 can receive a configuration instruction for pairing the network ports.

For example, the configuration instruction can instruct the network device 410 to form a pair (PAIR I) comprising the network port 212 ("N1") and the network port 214 ("N2"). The network device 410 records the pairing relationship of PAIR I in a pairing database 485 (or any other types of data structure). Based on the instruction, the network device 410 routes all network packets received at the network port 212 to the network port 214, after these packets being processed by the inline tool 220.

Similarly, the configuration instruction can instruct the network device 410 to form a pair (PAIR II) comprising the network port 218 ("N3") and the network port 216 ("N4"), a pair (PAIR III) comprising the network port 230 ("N5") and the network port 232 ("N6"), a pair (PAIR IV) comprising the network port 236 ("N7") and the network port 234 ("N8"), Thus, the network device 410 can look up the pairing database 485 to determine the pairing relationships between network ports as instructed by the configuration instruction.

Figure 5:
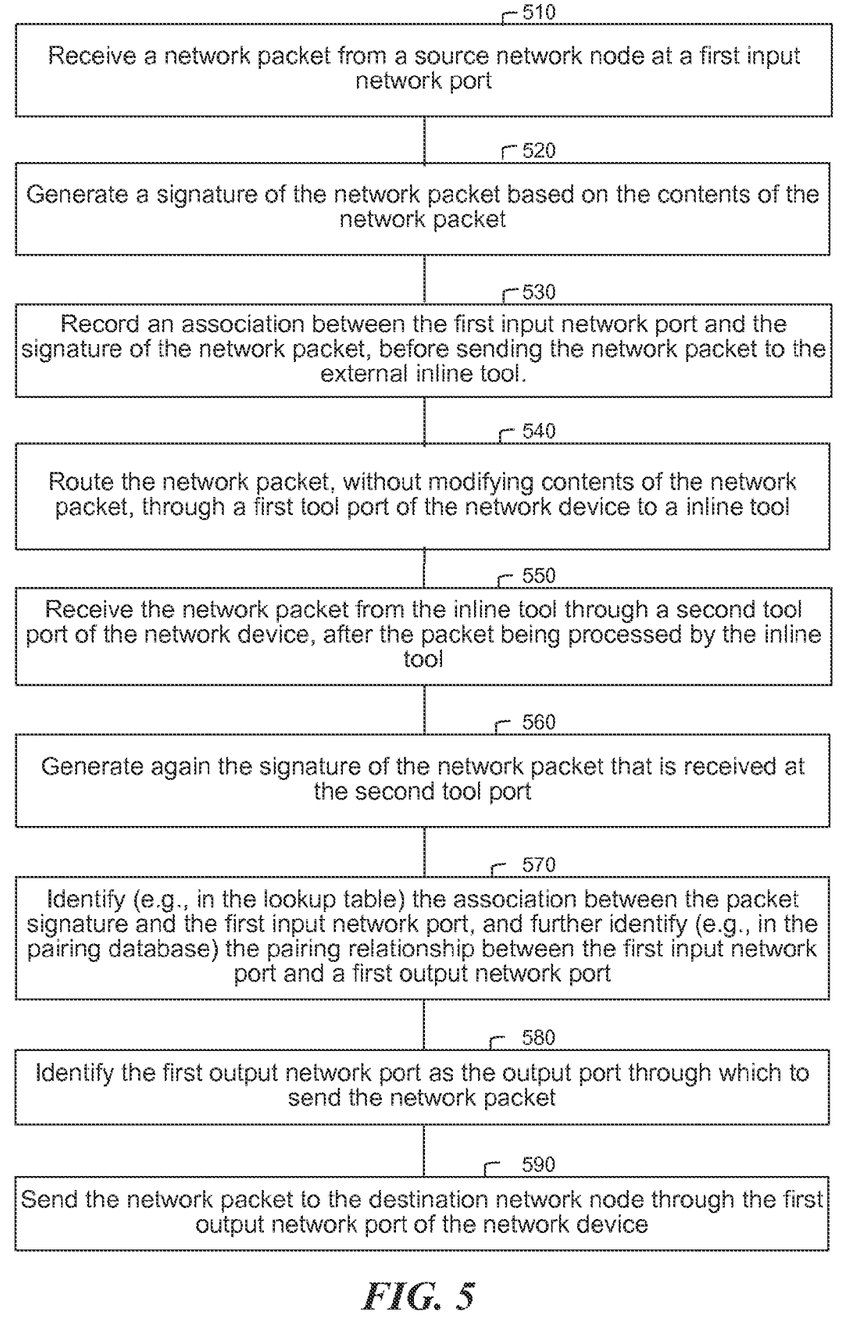
FIG. 5 illustrates a method performed by a network device for routing packets through an inline tool between two network nodes.

FIG. 5 illustrates a method 500 performed by a network device for routing packets through an inline tool. The network device can be, e.g., the network device 110 of FIG. 1, the network device 210 of FIG. 2, the network device 310 of FIG. 3 or the network device 410 of FIG. 4. In some embodiments, a processing unit of the network device (e.g., processor 704) can perform the method 500.

The method starts at block 510 in which the network device receives a network packet from a source network node at a first input network port. The network packet is destined for a destination network node. Both the source and destination nodes are external to the network device.

Upon receiving the network packet, at block 520, the network device generates a signature of the network packet based on the contents of the network packet. The signature of the network packet differentiates the network packet from network packets that are received from sources other than the source network node. In some embodiments, the signature includes a media access control (MAC) address of the source network node, which is extracted from a field of the network packet.

At block 530, the network device records an association between the first input network port and the signature of the network packet, before sending the network packet to the external inline tool. In some embodiments, the association is recorded in a data structure such as a lookup table as entry. The network device maintains a lookup table that includes a plurality of entries. Each of the entries records an association between an input network port of the network device and a signature of a network packet that has been routed to the external inline tool by the network device.

After recording the association between the port and the packet signature, at block 540, the network device routes the network packet, without modifying contents of the network packet, through a first tool port of the network device to an inline tool. The inline tool is external to the network device. The inline tool comprises an inline network monitoring tool that is part of a network path between the source and destination network nodes and that monitors network packets transmitted from the source network node to the destination network node.

After the inline tool has processed the packet, at block 550, the network device receives the network packet from the inline tool through a second tool port of the network device. The network device at block 560 again generates the signature of the network packet that is received at the second tool port. At block 570, the network device identify (e.g., in the lookup table) the association between the packet signature and the first input network port, and further identify (e.g., in the pairing database) the pairing relationship between the first input network port and a first output network port. At block 580, based on the association between the packet signature and the first input network port and the pairing relationship between the first input network port and a first output network port, the network device identifies the first output network port as the output port through which to send the network packet.

At block 590, the network device sends the network packet to the destination network node through the first output network port of the network device.

To optimize the lookup efficiency of the lookup table, the network device can control the size of the lookup table. The network device can set up an aging criterion for each entry of the lookup table. Once the aging criterion is satisfied, the network device removes the corresponding entry from the lookup table. For example, the network device can determine a maximum latency of the inline tool based on the performance profile of the inline tool, and set up an aging timer for each entry of the lookup table. If the aging timer passed the maximum latency (e.g., 100 ms), the network device assumes that the packet has been lost during the inline tool processing and removes the corresponding entry from the lookup table, in order to maintain a reasonable size for the lookup table.

Alternatively, the network device can record a reference count for each entry in the lookup table. The reference count indicates a number of network packets that have the same signature as in the entry and are being processed by the inline tool. Once the reference count drops to zero. The network device assumes that there is no packet with the signature being processing by the inline tool and removes the corresponding entry from the lookup table.

Figure 6:
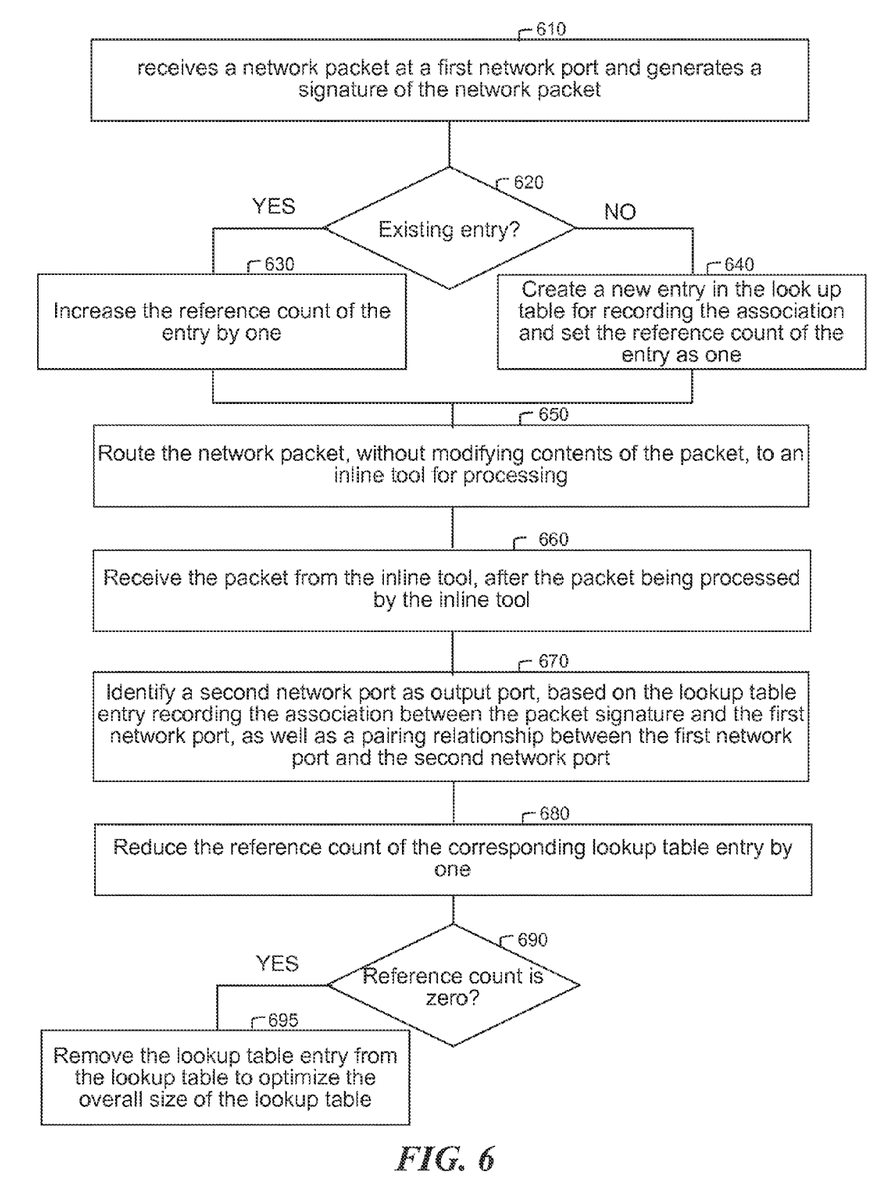
FIG. 6 illustrates a method performed by a network device for managing lookup table entries based on reference counts.

FIG. 6 illustrates a method 600 performed by a network device for managing lookup table entries based on the reference counts. The network device maintains the lookup table including entries that record associations between packet signatures and network ports. Each entry includes a reference count indicating a number of packets that have the signature and are being processed by the inline tool.

At block 610, the network device receives a network packet at a first network port and generates a signature of the network packet. At decision block 620, the network device determines whether there is an existing entry in the lookup table recording an association between the signature and the first network port. If so, at block 630, the network device increases the reference count of the entry by one. If there is no such entry, at block 640, the network device creates a new entry in the look up table for recording the association and sets the reference count of the entry as one.

At block 650, the network device routes the network packet, without modifying contents of the packet, to an inline tool for processing. After the inline tool has processed the packet, at block 660, the network device receives the packet from the inline tool. At block 670, the network device identifies a second network port as output port, based on the lookup table entry recording the association between the packet signature and the first network port, as well as a pairing relationship between the first network port and the second network port (e.g., based on information from a pairing database).

Upon receiving the packet from the inline tool, at block 680, the network device further reduces the reference count of the corresponding lookup table entry by one. At decision block 690, the network device determines whether now the reference count of the lookup table entry is zero. If so, at block 695, the network device removes the lookup table entry from the lookup table to optimize the overall size of the lookup table, since there are no network packets that have the signature are being processed by the inline tool.

Figure 7:
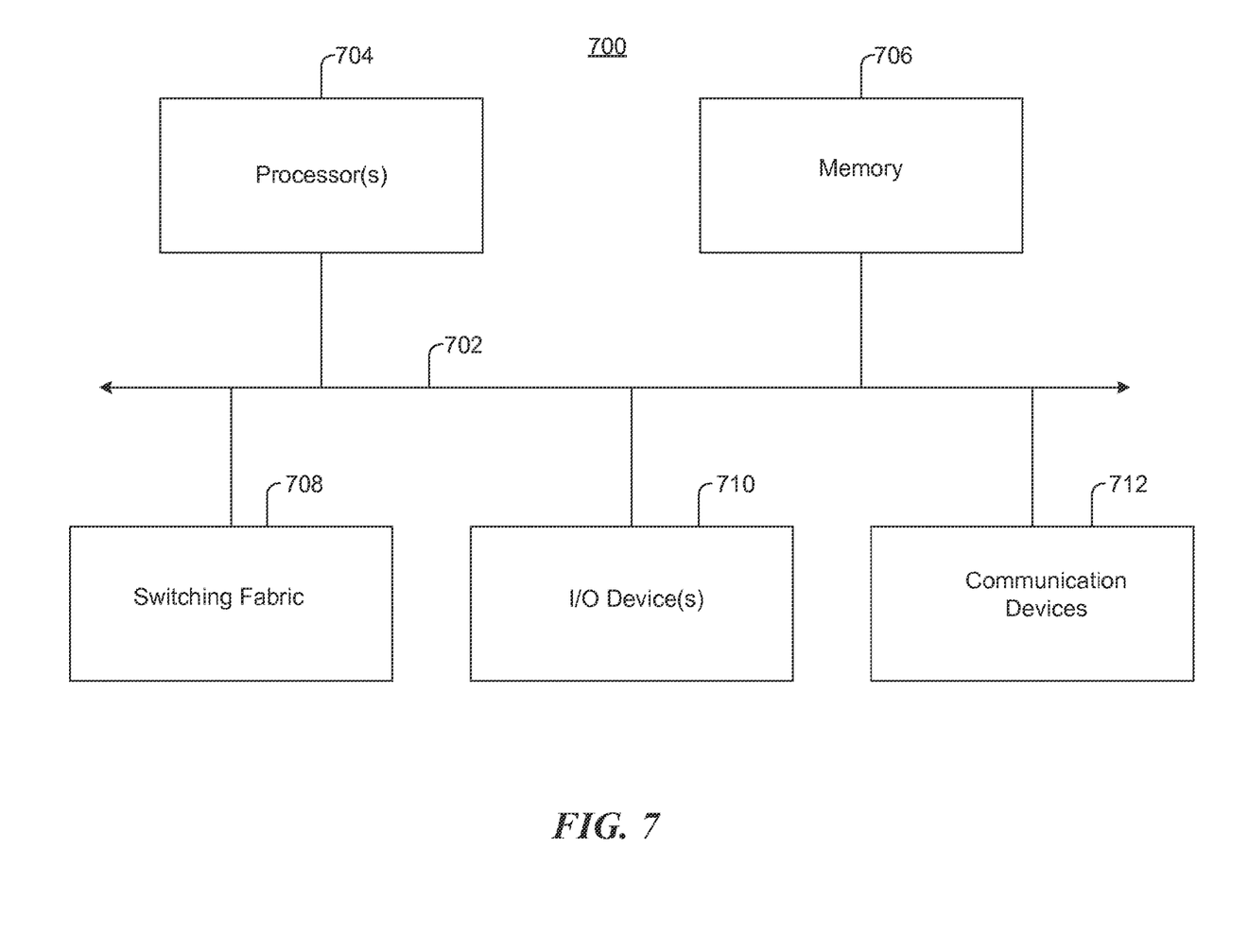
FIG. 7 illustrates an example of a network device in which the techniques introduced herein can be implemented.

FIG. 7 illustrates a high level example of the architecture of a network device 700 in which the techniques introduced above can be implemented. In some embodiments, the network device 700 represents the overall hardware architecture of the network device 110 or the network device 210 described above. The network device 700 includes a processor 704, a memory 706, a switching fabric 708, one or more network communication devices 712, and optionally one or more input/output devices 710, all of which are coupled to each other through an interconnect 702.

The processor 704 can be one or more general-purpose programmable microprocessors, microcontrollers, application specific integrated circuits (ASICs), programmable gate arrays, or the like, or a combination of such devices. The processor 704 controls the overall operation of the network device 700. The processor 704 can be used to perform various functions described herein. For example, in some embodiments, the processor 704 receive input from a user for configuring the network device (e.g., applying override settings to the packet transmission configuration of the network device and/or otherwise configuring the operations of the network device).

The memory 706 can be or include one or more physical storage devices, which may be in the form of random access memory (RAM), read-only memory (ROM) (which may be erasable and programmable), magnetic hard disk, flash memory, miniature hard disk drive, or other suitable type of storage device, or a combination of such devices. The switching fabric 708 can be a commodity packet switching fabric. The memory 706 can store data and instructions that configure the processor 704 to execute operations in accordance with the techniques described above.

The communication devices 712 can each be or include, for example, an Ethernet adapter, cable modem, Wi-Fi adapter, cellular transceiver, Bluetooth transceiver, or the like, or a combination thereof. Depending on the specific intended usage of the network device 700, the I/O devices 710 can include devices such as a display (which may be a touch screen display), audio speaker, keyboard, mouse or other pointing device, etc.

In this description, the term "computer-readable medium" refers to any medium that participates in providing instructions to the processor 704 for execution. Such a medium may take many forms, including but not limited to, non-volatile media, volatile media, and transmission media. Non-volatile media includes, for example, optical or magnetic disks, such as the storage device(s) 708. A non-volatile medium may be considered to be an example of a non-transitory medium. Volatile media includes dynamic memory, such as the memory 706. A volatile medium may be considered to be another example of a non-transitory medium. Transmission media includes coaxial cables, copper wire and fiber optics, including the wires that comprise the interconnect 702.

Unless contrary to physical possibility, it is envisioned that (i) the methods/steps described herein (e.g., method 500, 600, etc.) may be performed in any sequence and/or in any combination, and that (ii) the components of respective embodiments may be combined in any manner.

The machine-implemented operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), etc.

Software used to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a

What is claimed:

1. A method comprising:
receiving, at a first input network port of a network device, a network packet from a source network node and destined for a destination network node, the destination and source network nodes being external to the network device;
recording an association between the first input network port and a signature of the network packet;
routing the network packet, without modifying contents of the network packet, through a first tool port of the network device to an external inline tool, after recording the association;
receiving the network packet from the external inline tool through a second tool port of the network device;
in response to receiving the network packet from the external inline tool, identifying a first output network port as a port through which to send the network packet, based on the association, and based on a pairing relationship between the first input network port and the first output network port that identifies the first output network port of the network device as being paired with the first input network port; and
sending the network packet to the destination network node through the first output network port of the network device.

2. The method of claim 1, wherein the signature of the network packet differentiates the network packet from network packets that are received from sources other than the source network node.

3. The method of claim 1, further comprising:
generating the signature of the network packet based on the contents of the network packet, the signature comprising a media access control (MAC) address of the source network node extracted from the network packet.

4. The method of claim 1, wherein each of a plurality of input network ports of the network device is paired with one of a plurality of output network ports of the network device, and for an individual pair of input and output network ports, the network device routes all network packets received from the input network port of the individual pair to the output network port of the individual pair.

5. The method of claim 1, further comprising:
in response to an exception signal, directly routing a network packet from the first input network port to the first output network port through a bypass relay, such that the network packet does not travel through the external inline tool;
wherein the network device includes a plurality of pairs of input and output network ports, one of the pairs including the first input network port and the first output network port.

6. The method of claim 1, wherein the network device includes a plurality of input network ports and a plurality of output network ports, and the method further comprises:
receiving, at the network device, a configuration instruction for pairing an individual input network port of the input network ports with an individual output network port of the output network ports, such that the network device routes all network packets received from the individual input network port to the individual output network port.

7. The method of claim 1, further comprising:
maintaining a lookup table that includes a plurality of entries, each of the entries recording an association between an input network port of the network device and a signature of a network packet that has been routed to the external inline tool by the network device.

8. The method of claim 1, further comprising:
in response to receiving the network packet from the source network node, adding to a lookup table an entry recording an association between the first input network port and a signature of the network packet; and
in response to a determination that a specified aging criterion is satisfied, removing the entry from the lookup table.

9. The method of claim 1, further comprising:
in response to receiving the network packet form the source network node, adding to a lookup table an entry recording an association between the first input network port and a signature of the network packet, and setting a reference count of the entry as one if the entry was not already present in the lookup table; and
if the entry was already present in the lookup table, increasing the reference count of the entry by one.

10. The method of claim 9, further comprising:
in response to receiving the network packet form the external inline tool, decreasing the reference count of the entry by one; and
in response to a determination that the reference count of the entry is zero, removing the entry from the lookup table.

11. The method of claim 1, wherein the inline tool comprises an inline network monitoring tool that is part of a network path between the source and destination network nodes and that monitors network packets transmitted from the source network node to the destination network node.

12. A network device comprising:
a plurality of pairs of network ports through which to receive and transmit network packets between network nodes, the network nodes being external to the network device, wherein for each individual pair, the network device routes all network packets received from one network port of the individual pair to another network port of the individual pair;
a plurality of tool ports through which to communicate with an inline tool external to the network device;
a switching fabric coupled to each of the network ports and each of the tool ports;
and
a processing circuit coupled to the network ports and the tool ports, the processing circuit configured to control the network device to:
receive, at a first network port of the network device, a network packet from a source network node and destined for a destination network node;
generate a signature of the network packet based on the contents of the network packet;
add to a data structure an entry indicative of an association between the first network port and the signature of the network packet, before the network packet is routed to the inline tool;
route the network packet, without modifying contents of the network packet, through a first tool port of the network device to the inline tool;

receive the network packet from the inline tool through a second tool port of the network device;

in response to receiving the network packet from the inline tool, generate a signature of the network packet based on the contents of the network packet;

identify the generated signature with the signature of the entry in the data structure;

identify a second network port as being connected to the destination network node based on the association, and based on a fact that the first and second network ports belong to a pair; and send the network packet to the destination network node through the second network port.

13. The network device of claim 12, wherein the signature of the network packet comprises a media access control (MAC) address of the source network node extracted from a data field of the network packet.

14. The network device of claim 12, further comprising:
a plurality of bypass relays, each of the bypass relays interconnecting a separate pair of the network ports, wherein the bypass relay for an individual pair directly routes network packets from a network port of the individual pair to another network port of the individual pair by bypassing the switching fabric and the inline tool when the switching fabric or the inline tool malfunctions.

15. The network device of claim 12, further comprising:
a configuration interface configured to receive an configuration instruction for pairing a first network port with a second network port, such that the network device routes all network packets received from the first network port to the second network port; and
a port pairing table for recording the pairing relationships between the network ports of the network device.

16. The network device of claim 12, further comprising:
a data structure including a plurality of entries, each of the entries recording an association between a network port of the network device and a signature of a network packet, and a timestamp indicative of when the network device receives the network packet; and
wherein the processing circuit is further configured to:
in response to a determination that a specified aging criterion is satisfied, remove the entry from the data structure.

17. The network device of claim 12, further comprising:
a data structure including a plurality of entries, each of the entries recording an association between a network port of the network device and a signature, and a reference count being indicative of a number of network packets that have the signature and are being routed by the network device to the inline tool; and
wherein the processing circuit is further configured to:
generate a signature of the network packet based on the contents of the network packet;
add to the data structure an entry indicative of an association between the first network port and the signature of the network packet, and set the reference count of the entry as one if the entry does not exist in the data structure; and
if the entry does exist in the data structure, increase the reference count of the entry by one.

18. The network device of claim 17, wherein the processing circuit is further configured to:

in response to receiving the network packet form the inline tool, decrease the reference count of the entry by one; and in response to a determination that the reference count of the entry is zero, removing the entry from the data structure.

19. A non-transitory machine-readable medium storing machine-executable instructions, execution of which by a processing system causes the processing system to perform operations comprising:

receiving, at a first network port of a network device, a network packet from a source network node and destined for a destination network node, both the destination and source network nodes being external to the network device;

adding an entry in a data structure stored in the network device, the entry recording an association between the first network port and a signature of the network packet, before routing the network packet to an external inline tool;

routing the network packet to the external inline tool without modifying contents of the network packet;

receiving the network packet from the external inline tool;

in response to receiving the network packet from the external inline tool, identifying a second network port of the network device as a port which to send the network packet, based on the association between the first network port and the signature of the network packet and a pairing relationship between the first and second network ports; and sending the network packet to the destination network node through the identified second network port.

20. The machine-readable medium of claim 19, wherein the signature of the network packet comprises a media access control (MAC) address of the source network node extracted from a field of the network packet.

21. The machine-readable medium of claim 19, wherein the instructions further causes the processing system to perform operations comprising:
setting up a pair of two network ports of the network device, such as the network device routes all network packets received from one network port of the pair to the other network port of the pair.

22. The machine-readable medium of claim 19, wherein the instructions further causes the processing system to perform operations comprising:
recording a timestamp of receiving the network packet in the entry; and
if a time period corresponding to the timestamp exceeds a maximum latency of the external inline tool, removing the entry.

23. The machine machine-readable medium of claim 19, wherein the instructions further causes the processing system to perform operations comprising:
recording a reference count in the entry, the reference count being indicative of a number of network packets that have the signature and are being routed by the network device to the external inline tool;
decreasing the reference count by one, in response to receiving the network packet from the external inline tool; and
removing the entry if the reference count is zero.

* * * * *